United States Patent [19]

Davis

[11] 3,944,383

[45] Mar. 16, 1976

[54] DYEING PROCESS

[76] Inventor: Oliver Thurston Davis, Rte. 1, P.O. Box 33, Dunlap, Tenn. 37327

[22] Filed: Mar. 13, 1974

[21] Appl. No.: 450,907

[52] U.S. Cl. .............................. 8/80; 8/81; 210/60; 210/62
[51] Int. Cl.² ........................................... D06P 1/68
[58] Field of Search ................ 8/81, 80; 210/62, 60

[56] References Cited
UNITED STATES PATENTS

| | | | |
|---|---|---|---|
| 3,649,493 | 3/1972 | Meiners et al. | 210/62 |
| 3,806,316 | 4/1974 | Lewkowitz et al. | 8/80 |
| 3,807,947 | 4/1974 | Lasas | 8/81 |
| 3,829,380 | 8/1974 | Oohara | 8/80 |

*Primary Examiner*—V. P. Hoke

[57] ABSTRACT

In the dyeing process of fibrous materials wherein the materials are contacted with a heated aqueous dye medium, the dye removed and the dyed material rinsed, the improvement wherein the aqueous dye containing medium and preferably the dye containing rinses are sent to a treating zone maintained at a pH of at least 7 and treated with an alkali earth metal hypochlorite such as calcium hypochlorite and aluminum sulfite whereby the treated mixture settles into an upper clear aqueous phase and a bottom colored phase, residual chlorine is removed from the clear aqueous phase and the resulting clear aqueous phase passed in heat exchange relationship to the aqueous dye containing material directed to the treating zone and returning the clear, chlorine-free water to the dyeing operation.

8 Claims, 1 Drawing Figure

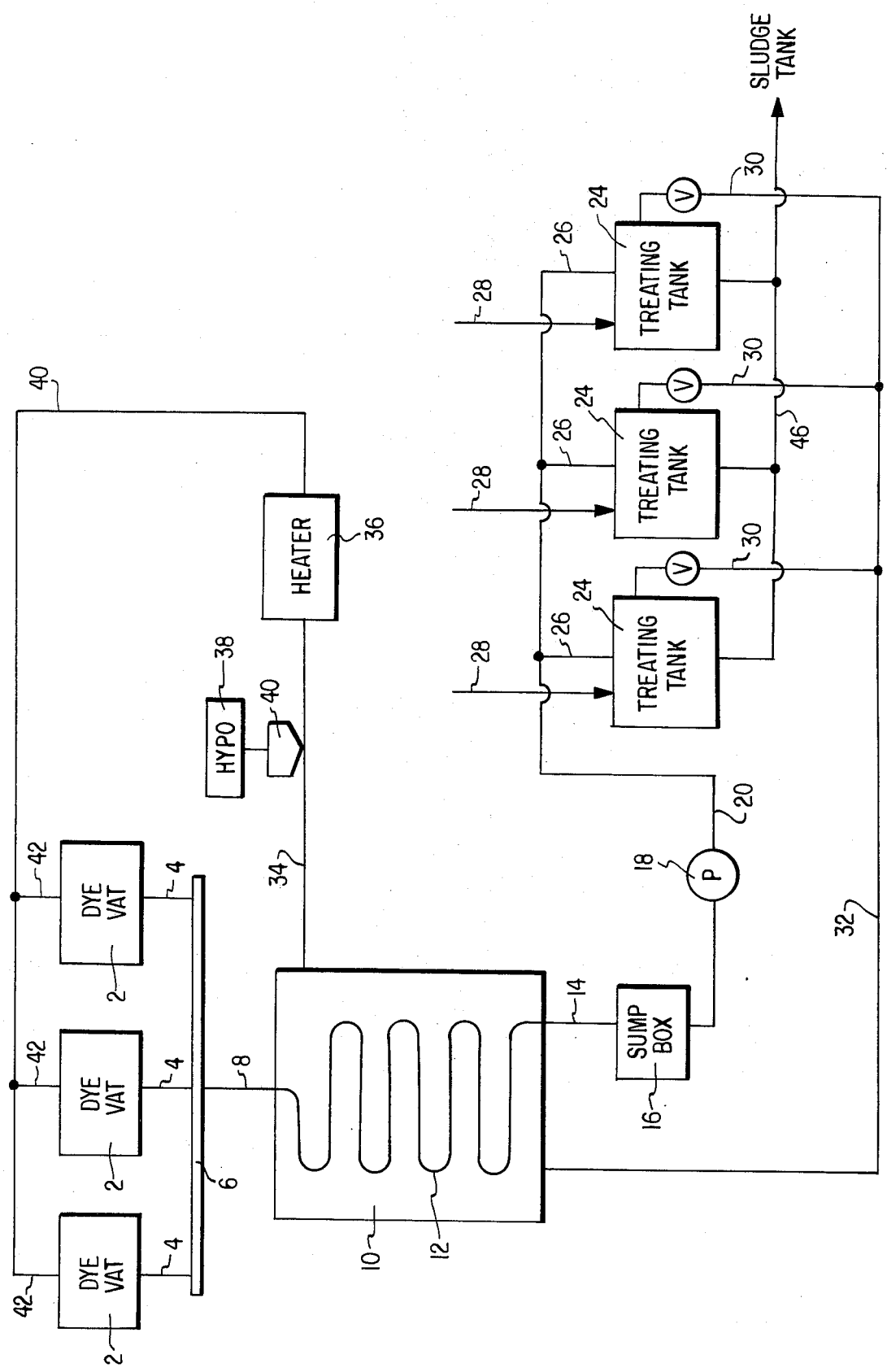

DYEING PROCESS

BACKGROUND OF THE INVENTION

1. Field of the Invention

The present invention is directed to an improvement in the process of dyeing synthetic and natural fibrous materials.

2. Description of the Prior Art

In the dyeing of synthetic and natural fibrous materials, one of the fundamental processes involves contacting the fibrous material in a tank or vat with a dye liquor heated to an elevated temperature usually up to the boiling point of the dye liquor. When the dyeing is complete the spent dye liquor is removed from the tanks or vats and sewered. The tanks or vats are usually again filled with a fresh supply of clear warm water to start a rinse which is also sewered. Multiple rinses with warm water are quite common, continuing for as long as desired, and capped off by a final rinse with cold water. As the rinses continue, the rinse waters contain progressively smaller amounts of dye material.

In addition to the dye substance contained in the dye liquors employed, the dye liquors frequently contain a variety of chemicals depending on the particular dyeing operation employed, the dye utilized and the fibrous material being dyed. The following represent an example of chemicals which are commonly utilized in dyeing processes: acetic acid, formic acid, sodium sulfite, anionic detergent, cationic detergent, ammonium sulfate, monosodium phosphate, disodium phosphate, trisodium phosphate, sodium hexametaphosphate, soda ash, sodium chloride, etc. The pollution and environmental problems caused by the sewering of these dyes and the chemicals contained in their liquors is self-evident and needs no further elaboration.

Other disadvantages in conventional dyeing processes involve the economic losses incurred by the water from the spent dye medium and subsequent rinses which cannot be used and must be disposed.

OBJECTS

It is an object of the present invention, therefore, to reduce significantly the pollution and environmental problems caused by the sewering of spent dye medium and the subsequent rinses of said dyeing operation by making the water in these media reusable in the dyeing operation.

It is another object of the invention to make the water utilized in the dye medium and the subsequent rinse operations reusable in the dye process thereby reducing the economic losses incurred by the sewering of this water.

Yet another object of the present invention is to provide a process that permits great savings in the energy requirements involved in the heating of the dye liquor or medium in the dyeing operation.

SUMMARY OF THE INVENTION

These and other objects of the invention are obtained by the improvement which comprises passing at least the aqueous dye-containing medium to at least one treating zone, maintaining the aqueous dye-containing medium at a pH of at least 7.0 and thoroughly mixing therewith 1 to 10 parts per million of alkali earth metal hypochlorite. To this mixture there is then added 1 to 10 parts per million of aluminum sulfate and the composition is then allowed to settle into an upper clear aqueous phase and a bottom phase of colored materials. The bottom phase is removed and the upper phase is treated for the removal of residual chlorine. The chlorine-free aqueous phase is then passed in heat exchange relationship with the aqueous dye-containing medium being directed to the heating zone from the dyeing zone, and then returning the clear, chlorine-free water to the dyeing zone.

DETAILED DESCRIPTION OF THE INVENTION

The dyeing operation of the present invention includes any of the dyeing processes wherein a synthetic or natural fiber or fibrous material is dyed in a zone such as a vat or tank or other appropriate dyeing section utilizing an aqueous dye liquor or medium. The dyeing operation may be a batch system or a continuous system wherein the fibrous material is impregnated with the dye and passed through a series of developing, washing, and drying zones to a final take up roll.

The aqueous dye liquors may be any of the conventional aqueous medias containing water-dispersible or water soluble dyes. These dyes include, for example, acid dyes, basic dyes, mordant dyes, direct dyes, disperse dyes, vat dyes, ingrain dyes and the like. The acid dyes are sodium salts of sulfonic acids that are dyed from a bath acidified with sulfuric or acedic acid. Illustrative of acid dyes are azo dyes such as Orange II ($\beta$-naphthol Orange); acid dyes derived from anthraquinone which are sulfonated amino or hydroxy derivatives such as Acid Alizarin Blue B, Alizarin Cyanime Green, and anthraquinone Blue Black B; nitro and nitroso compounds such as Naphthol Yellow S, and Naphthol Green B; diazo dyes such as Congo Red and Benzopurpurin 4B. The basic dyes are the hydrochlorides of zinc chloride compounds of dyes having basic groups. They are dyed from a neutral bath, usually on a fiber that has been treated with tannic acid. Illustrative of basic dyes are monoazo dyes such as Chrysoidine Y; diazo dyes such as Bismarck Brown R; Malachite Green; Chrystal Violet and the like. Illustrative of the mordant dyes are the anthraquinone dyes such as Alizarin. Examples of suitable vat dyes are those recognized in the art as anthraquinone vat dyes such as Indanthrene Blue R and Anthraquinone Vat Blues 9CD and BCS. The disperse dyes are those originally developed for use on the synthetic fiber, cellulose acetate, but its use has been extended to many of the newer synthetic fibers developed after cellulose acetate. The disperse dyes are slightly water soluble and are utilized in the dyeing process in the form of a water suspension or dispersion of the dye. Illustrative of the ingrain dyes are the water insoluble azo dyes such as the ice colors or azoic dyes.

As aforementioned the process of the present invention can be utilized in the dyeing of natural fibers such as wool, cotton, silk and the like as well as synthetic fibers such as nylon, polyester, acrylic fibers, rayon, etc. The dyeing may be of the fibers per se or textile materials or fabrics manufactured therefrom.

The particular dye liquor employed in a given dyeing operation will vary depending upon the nature of the fibrous material being dyed. In all instances, however, the dye liquor including the chemicals employed therein will usually be heated to an elevated temperature which is below the degradation temperature of the fiber being dyed and usually up to the boiling point of the dye liquor.

The rinse operations are usually effected utilizing warm water, that is, water at a temperature below that at which the dyeing operation was effected. Ordinarily the rinse water is heated to a temperature of about 150° to 200° F. A single rinse operation may be possible depending on the particular dyeing operation and material being dyed but generally comprises a plurality of rinses which are continued until there is no visible trace of dye in the rinse water removed. The final rinse is usually with cool water.

The treating zone in which the clarification of the dye water and rinse waters is effected may be any convenient zone such as a container, tank or vat provided with means for returning clarified water in heat exchange relationship to spent dye liquor or colored rinse water being directed to the treating zones. The actual treatment can be carried out by simply mixing thoroughly alkali earth metal hypochlorite, preferably calcium hypochlorite, with the dye water and/or rinse water. The preferred amounts of alkali earth metal hypochlorite generally fall within the range of about 4 to 12 parts per million. The mixing of the alkaline earth metal hypochlorite and dye containing water is continued until a slight difference in color is noted. There is then added the aluminum sulfate (alum) preferably in an amount of about 1 to 10 parts per million after which the mixture is allowed to settle into an upper clear and a lower or bottom phase containing all the coloring and foreign materials. In most instances the upper clear phase will constitute approximately 85 to 90% of the dye-containing water. The settling time will vary depending upon the particular material being dyed and the dyes employed but will generally fall within the range of about ½ hour to 1 hour.

The clarified water at this stage is not suitable for use in the dyeing step of the present invention inasmuch as it contains chlorine or chlorine-producing materials which adversely effect the dyeing actually causing fading of the dyed materials. This chlorine or chlorine-producing materials must therefore be removed from the clarified water preliminary to reintroduction into the dyeing zone or zones. Removal of the chlorine may be accomplished is several ways. One way is by subjecting the clarified water to thorough aeration, preferably while subjecting it to the presence of ultra-violet light and following such treatment by filtration. Alternatively, the clarified water can be heated to a temperature of at least 180°F for at least about 20 minutes. Yet a third and a preferred method comprises adding alkali metal thiosulphate in an amount of about 1 to 10 parts, preferably 5 to 8 parts per million. These treatments have been found not only to effectively remove the non-desirable chlorine from the clarified water but also to destroy other chemical materials such as unreacted HTH and other chemicals that may be present in the clarified water.

It is important that the treating step of the process be conducted while maintaining the pH of the dye containing water at a pH of at least 7.0, preferably a pH of 7.0 to 8.6. Thus, in those cases where acidic conditions exist in the dyeing medium it will be necessary to add alkaline materials to adjust the pH to at least 7.0. Any of a number of suitable alkali or alkaline materials can be utilized for this purpose, most preferred being hypochlorite of lime (HTH). The concentrations of the alkaline material added will vary generally from about 5 to 20 parts per million depending upon the particular existing acidic conditions.

Preliminary to reintroduction of the thus clarified water into the dye zones of the invention, the clarified water is passed in heat exchange relationship to the dye liquor and/or dye containing rinse water. The heat exchange of these materials will provide cooling of the hot water being passed from the heating zones to raise the temperature of the clarified water being reintroduced approximately 50°. In this way a great savings in the energy requirements expended to heat the waters employed in the dyeing zone is obtained.

The invention will now be described with reference to the accompanying drawing which is a schematic representation of the dyeing process of the invention. Referring to the drawing, dye vats 2 are each filled with 3,000 gallons of cold water. Into the water is place 16,000 grams of the dye and the fibrous material to be dyed such as a polyester. The aqueous medium is then brought to a boil (approximately 212°F), and maintained there at for about an hour. The spent dye water is withdrawn from each vat via line 4 thereof and enters a mainline 6 that connects with a main drain 8. The main drain 8 enters a heat exchanger means 10 and connects therein with a coil 12. The dye water exits heat exchanger 10 via an outlet line 14 which enters a sump box 16 and is pumped therefrom by pump 18 through line 20 into the treating tanks 24 through inlet pipes 26. The sump box 16 is provided with a float switch which cuts on the pump when the box is full and off when the box is empty. The treating tanks 24 are each equipped with stirring means and inlets 28 through which there is first added calcium hypochlorite in a proportion of about 4 parts per million. The mixing is continued until a slight difference in color is observed at which time there is then added aluminum sulphate (alum) in a proportion that is equivalent to 1¼ teaspoon per 5 gallans of dye water. The mixture is stirred for 2 minutes and allowed to settle. In approximately 5minutes the beginning of clearing at the top of the tank will be observed and in about 1 hour all the coloring and foreign matter has settled to a bottom phase. The top clear phase constitutes approximately 85 to 90% of the dye water. The water thus clarified is removed from treating tanks 24 by means of line 30 and transferred through line 32 into heat exchanger 10 which serves also as a storage means for the clarified water to be returned to the vats 2. When additional clarified water is needed in vats 2, it is removed from heat exchanger-storage means 10 and passed by line 34 into a heater 36. Preliminary to passage into heater 36 sodium thiosulphate from storage means 38 is introduced into chemical feeder 40 which distributes into line 34 for admixture with the clarified water at a concentration of about 5 parts per million of clarified water which readies the clarified water for heating in heater 36 and return to the vats 2 by means of line 40 and inlet lines 40. The colored sludge material from the bottom phase in the treating tanks is drained from the tanks by means of lines 44 and taken by a main sludge line 46 to a sludge tank.

To further demonstrate the advantages provided by the present invention the following comparative example was carried out:

Two cotton fabrics were dyed with an aqueous acid all purpose dye such as "All Purpose Rit Concentrated Tint and Dye" manufactured by CDC International Inc. of Indianapolis, Indiana. Each dyeing operation was identical except that the water employed in the dyeing in the one instance was clarified water obtained by the process of the present invention from a previous dyeing operation and the water of the comparative run was ordinary tap water. Both dyeing operations were conducted utilizing 1⅛ oz. or 31.9 g of dye in 3 gallons of water having added thereto 1 pound of white cotton cloth. In each instance the aqueous dye medium was heated to boiling and maintained at boiling for 30 minutes. The dyed fabric was then rinsed twice with hot water (180° F) then once with cold water until no dye was visible in the cold water rinse.

A comparison of the two fabrics thus dyed shows the dyeing effected with the clarified water employed in the process of the present invention to be brighter than that utilizing straight tap water.

It is to be understood that the invention is not limited to the exact details of operation or exact materials or procedures shown and described as obvious modification and equivalence will be apparent to one skilled in the art, and the invention is, therefore, to be limited only by the full scope of the appended claims.

What is claimed is:

1. In a dyeing process for fibrous materials which comprises contacting in at least one dyeing zone the fibrous material to be dyed with a heated aqueous medium containing a water-soluble or water-dispersible dye for said material, removing said aqueous dye-containing medium from said contacting zone after said dyeing, subjecting said dyed material to at least one water rinse operation, the improvement which comprises passing at least said aqueous dye-containing medium to at least one treating zone, maintaining said aqueous dye-containing medium in said treating zone at a pH of at least 7.0 and thoroughly mixing therewith 1 to 10 parts per million of alkali earth metal hypochlorite, adding to the resulting mixture 1 to 10 parts per million of aluminum sulfate, allowing the resulting mixture to settle and form an upper clear aqueous phase and a bottom phase of colored materials, removing said bottom phase, passing said clear aqueous phase to a heat exchanger means in heat exchange relationship with spent aqueous dye-containing medium from said contacting zone after said dyeing to raise the temperature of the clear aqueous phase, removing said heat exchanged clarified aqueous phase from said heat exchanger means to a residual chlorine removal zone wherein residual chlorine is removed by a method selected from the group consisting of aeration with stirring in the presence of ultra violet light followed by filtration, heating to a temperature of at least 180° F for at least 20 minutes and adding 1 to 10 parts per million of alkali metal thiosulfate, and then reheating and returning the clear, chlorine-free water to said dyeing zone.

2. The process of claim 1 wherein the alkaline earth metal hypochlorite is calcium hypochlorite.

3. The process of claim 1 wherein the aqueous rinses are also passed to the treating zone.

4. The process of claim 1 wherein about 3 to 6 parts per million alkaline earth metal hypochlorite are mixed.

5. The process of claim 1 wherein 6 to 12 parts per million aluminum sulfate are added.

6. The process of claim 1 wherein the pH of the dyeing containing medium in said heating zone is about 7.0 to 8.6.

7. The process of claim 1 wherein the dye is an acid dye.

8. The process of claim 1 wherein the dye is a disperse dye.

* * * * *